United States Patent Office 3,640,927
Patented Feb. 8, 1972

3,640,927
POLYMERIZATION PRODUCTS OF VINYL MONOMERS AND ACRYLATE OR VINYL ESTER TERMINATED POLYESTERS
Carl S. Marvel and Roberta C. L. Chow, Tucson, Ariz., assignors to the United States of America as represented by the Secretary of Agriculture
No Drawing. Filed Jan. 22, 1969, Ser. No. 793,189
Int. Cl. C08f 15/26, 15/28, 21/04
U.S. Cl. 260—23 CP                     12 Claims

ABSTRACT OF THE DISCLOSURE

There are disclosed herein addition copolymers of (a) a vinyl monomer and (b) a polymerizable polyester, for example, an acrylate or a vinyl ester of a polyester of an aliphatic hydroxycarboxylic acid. A typical example is the copolymer of (a) vinyl chloride and (b) a vinyl ester of a polyester of 10-hydroxydecanoic acid. This copolymer is useful for preparing flexible films.

---

This invention relates to novel and useful copolymers, more particularly addition copolymers of (a) a vinyl monomer and (b) a polymerizable ester of a polyester of an aliphatic hydroxycarboxylic acid. Further objects of the invention will be evident from the following description wherein parts and percentages are by weight unless otherwise specified.

Polymers prepared from vinyl monomers, such as vinyl chloride, vinyl acetate, methyl methacrylate, etc., are well known articles of commerce. In some cases these polymers are too hard or brittle for an intended use and it is necessary to render them more plastic. Such properties are commonly imparted physically by incorporating with the polymer a plasticizer such as an ester of sebacic or phthalic acid. This technique of external plasticization is not entirely satisfactory because the plasticizer tends to exude out of the finished product, giving rise to such problems as surface stickiness and gradual loss of plasticity.

A primary object of the invention is to obviate the problem outlined above. This is accomplished by what may be termed internal plasticization. That is, the plasticizer is chemically incorporated into the polymer molecule so that it is bound therein and will not exude from the product. More particularly, a major proportion of the vinyl monomer is copolymerized with a minor proportion of a polyester which has been provided with a vinylic end-group, that is, a radical containing a $CH_2=C<$ grouping. The resulting copolymer contains a major proportion of repeating units derived from the vinyl monomer and a minor proportion of repeating units derived from the polyester. The latter units provide the copolymer with the desired plasticity. Moreover, since these polyester units are chemically bound to the copolymer molecules, they are a permanent part thereof and the exudation noticed with external plasticizers does not occur.

The vinyl monomer in accordance with the invention is preferably vinyl chloride. However, the invention is not restricted to this particular compound, and generically one may employ any polymerizable vinyl monomer. Illustrative examples thereof are provided in the following listing:

Alkyl esters of acrylic acid and alkyl esters of any of the various α-alkylacrylic or α-haloacrylic acids, e.g., the methyl, ethyl, propyl, isopropyl, butyl, amyl, hexyl, octyl, decyl, dodecyl, tetradecyl, hexadecyl, octadecyl, cyclohexyl, oleyl, etc., esters of acrylic, methacrylic, ethacrylic, propacrylic, chloracrylic, bromoacrylic, etc. acids.

Aryl and aralkyl esters of acrylic acid or the α-substituted acrylic acids, e.g., phenyl, o-, m-, p-tolyl, dodecylphenyl, benzyl, phenylethyl, etc., esters of acrylic, methacrylic, ethacrylic, propacrylic, chloroacrylic, bromoacrylic, etc. acids.

Alkyl acrylates or methacrylates containing an oxygen bridge, typically methoxyethyl acrylate, ethoxyethyl acrylate, propoxyethyl acrylate, butoxyethyl acrylate, octoxyethyl acrylate, cyclohexoxyethyl acrylate, benzoxyethyl acrylate, phenoxyethyl acrylate, methoxyethyl methacrylate, phenoxyethyl methacrylate, etc.

Acrylates containing such radicals as thioether, sulphone, or sulphoxide, for example, the esters of acrylic acid or methacrylic acid with alcohols of the types:

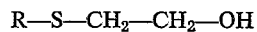

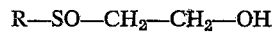

wherein R is an alkyl radical such as methyl, ethyl, propyl, butyl, etc., or an aryl or aralkyl radical such as phenyl, tolyl, benzyl, phenylethyl, etc.

Vinyl esters of fatty acids, e.g., vinyl acetate, propionate, butyrate, valerate, caprylate, caprate, laurate, myristate, palmitate, stearate, oleate, etc.

Allyl and methallyl esters of fatty acids, e.g., allyl and methallyl acetates, propionates, butyrates, valerates, caprylates, caprates, laurates, myristates, palmitates, stearates, oleates, etc.

N-dialkyl acrylamides and N-dialkyl α-substituted acrylamides, for example, N-dimethyl, N-diethyl, N-dipropyl, N-dibutyl, N-diamyl, N-dihexyl, N-dioctyl, N-didodecyl, etc., acrylamides, methacrylamides, ethacrylamides, propacrylamides, etc.

Halogenated olefinic hydrocarbons such as vinyl chloride, vinyl bromide, vinylidene chloride, vinylidene bromide, vinyl fluoride, etc.

Ketones such as methyl vinyl ketone, ethyl vinyl ketone, isopropyl vinyl ketone and other alkyl vinyl ketones, methyl isopropyl ketone, methyl alkyl ketone, etc.

Itaconic diesters, for example, the dimethyl, diethyl, diisopropyl, dibutyl, dihexyl, didodecyl, and other dialkyl esters of itaconic acids. Diaryl and diaralkyl esters of itaconic acid, e.g., diphenyl itaconate, dibenzyl itaconate, di-(phenylethyl) itaconate, etc.

Vinyl ethers, for example, monomers of the type $CH_2=CH-O-R$ wherein R is an alkyl radical such as methyl, ethyl, propyl, butyl, benzyl, etc.

The compound copolymerized with the vinyl monomer is accordance with the invention is a polymerizable derivative of a polyester of an aliphatic monohydroxy carboxylic acid containing 6 to 24 carbons and wherein the hydroxy group is at least 5 carbon atoms removed from the carboxyl group. Such polyesters are readily prepared by self-condensation of the hydroxy carboxylic acid using well-known methods. Illustrative examples of hydroxy carboxylic acids from which the polyester may be prepared are as follows: 6-hydroxy caproic acid, 8-hydroxy caprylic acid, 10-hydroxy capric acid, 11-hydroxy undecanoic acid, 12-hydroxy lauric acid, 14-hydroxy myristic acid, 16-hydroxy palmitic acid, 18-hydroxy stearic acid, 9-, 10-, 11-, or 12-hydroxy stearic acid, 14-hydroxy behenic acid, ricinoleic acid, lesquerolic acid, and the like. In a typical method of synthesis the selected hydroxy carboxylic acid—such as 10-hydroxydecanoic acid—is heated at about 165-175° C. in the presence of antimony trioxide catalyst in an inert (oxygen-free) atmosphere. Ordinarily, polyesters having a molecular weight about from 1000 to 5000 are preferred.

To make the polyester polymerizable it is next esterified to provide it with a radical containing a $CH_2=C<$ grouping. By suitable choice of reagents and procedures the esterification can be applied to the terminal carboxy group or the terminal hydroxy group of the polyester. Typically, the terminal carboxy group of the polyester may be converted into a vinyl ester group. This may be accomplished by methods well known in the art, for example, by ester interchange which involves reacting the polyester with vinyl acetate in the presence of a mercuric salt as a catalyst and with addition of a small proportion of an inhibitor to prevent the vinyl derivative from polymerizing during the esterification. Suitable for use as the inhibitor is copper resinate, a commercially-available product which is an oil-soluble copper salt made by heating copper sulphate with rosin oil. The net result of the ester interchange is that the end carboxyl group

of the polyester is converted into a vinyl ester group

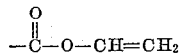

When, in the alternative, it is desired to utilize the hydroxy end group of the polyester for conversion into a radical containing vinylic unsaturation, it is preferred to operate in a modified way to protect the carboxy group. To this end, the starting material—the hydroxy carboxylic acid—is first converted into its methyl (or ethyl) ester and this ester is then subjected to self-condensation in the presence of litharge, yielding a polyester wherein the terminal carboxyl group is esterified with methyl. In other words, one terminal group is —COOCH₃ rather than COOH. The other terminal group (—OH) of this methyl polyester can then be readily converted into an acrylate (or methacrylate) group

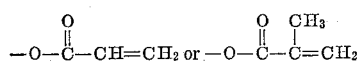

by conventional esterification, i.e., by reaction with acryloyl (or methacryloyl) chloride in the presence of a tertiary amine as an HCl-acceptor. It is to be emphasized that the above-outlined procedure of blocking the carboxyl group of the polyester with a methyl (or other lower alkyl group) is merely done for convenience in preparing the acrylate (or methacrylate) derivative of the polyester, and that it has no substantial effect on the copolymers of the invention.

The copolymers of the invention are prepared by conventional polymerization techniques. Thus, the co-reactants are intimately mixed and the mixture is copolymerized in the presence of a polymerization catalyst, such as, for example, an alkali metal persulfate, benzoyl peroxide, acetyl peroxide, lauroyl peroxide, di-tert-butyl peroxide, or other peroxide, or a redox catalyst system such as a combination of a ferrous salt and a peroxide or an alkali metal persulphate. The copolymerization may be promoted by applying heat, light, heat plus light, UV radiation, etc. The copolymerization may be conducted in the bulk or in the solution state, for instance, in solution in an inert solvent such as benzene, toluene, xylene, dioxane, dibutyl ether, butyl acetate, chlorobenzene, ethylene dichloride, methyl ethyl ketone, or fluorohydrocarbons such as benzotrifluoride, 1,3-bis-(trifluoromethyl)-benzene, etc. The temperature of copolymerization may be varied as desired or the conditions may require and generally will be within the range from about 20° to 100° C. It is obvious that in any particular case, the temperature of polymerization should be below the decomposition temperature of the substances being reacted and that of the copolymer being prepared. A preferred procedure involves emulsion polymerization. The co-reactants are emulsified in an aqueous medium containing a conventional emulsifying agent—such as soap or an alkyl benzene sulphonate—and a redox catalyst system, typically a combination of a ferrous, chromous, manganous, or cuprous salt and an oxidizer such as hydrogen peroxide, an alkali metal persulphate or perborate, or the like. In preparing the copolymers of the invention, the proportions of vinyl monomer and the polymerizable polyester may be varied widely. Ordinarily, the vinyl monomer is used in major proportion, e.g., 55 to 95% of the copolymer mixture while the polymerizable polyester makes up the remainder—5 to 45%. It has been observed that in preparing copolymers of vinyl chloride, particularly useful results are attained wherein vinyl chloride is used in a proportion of about 75–90%, the proportion of the polymerizable polyester being then 10–25%. The copolymers of the invention are useful for all the usual applications of plastic materials. Thus, they may be employed for preparing films; they may be used in coating, adhering, and laminating applications; they may be molded into articles of all kinds.

The polymerizable polyester derivatives described herein are, per se, new compounds not heretofore known or described. They are primarily useful as intermediates in the preparation of polymers, particularly copolymers with vinyl chloride, vinyl acetate, or other polymerizable vinyl monomer.

EXAMPLES

The invention is further demonstrated by the following illustrative examples.

The abbreviation THF used in the examples refers to tetrahydrofuran.

Inherent viscosities were measured on 0.2% solutions of the material in question in THF at 30° C.

EXAMPLE 1.—VINYL ESTER OF THE POLYESTER OF 10-HYDROXYDECANOIC ACID 10-hydroxydecanoic acid (6.2 g.) and antimony trioxide (0.0115) were stirred and heated at 170±5° C. for 3 hours under nitrogen. At the end of this period, vacuum was applied and heating continued for 3 additional hours. The reaction product was cooled, dissolved in chloroform and reprecipitated by adding acetone. The solvent was decanted and the polyester was dried in vacuum to give a granular material which had a M.P. of 77–79°, an inherent viscosity of 0.26, and the expected infrared spectrum. The molecular weight, determined by titration, was about 2000–2500.

A mixture of the polyester prepared as above described, mercuric acetate (0.4185 g.), copper resinate (0.2 g.), and vinyl acetate (120 ml.) was stirred at room temperature for one hours to acquire homogeneity. About 5 drops of conc. sulphuric acid were then added and the stirring continued at room temperature for 3 days. Then the excess vinyl acetate and the acetic acid produced in the reaction were recovered under reduced pressure at a temperature below 60° C. The residual material was dissolved in chloroform, into which was added 5 g. of potassium carbonate and the mixture was stirred at room temperature for ca. 1 hour. This was filtered and part of the chloroform was removed from the filtrate to leave behind a very viscous solution. The polyester was precipitated upon the addition of acetone. It was further purified by several recrystallizations from chloroform and acetone, and had a M.P. of 76–79° C. and an inherent viscosity of 0.20.

Analysis (percent): C, 69.77; H, 10.54.

EXAMPLE 2.—VINYL ESTER OF THE POLYESTER OF 12-HYDROXYSTEARIC ACID 12-hydroxystearic acid (20 g.) and antimony trioxide 0.0425 g.) were stirred and heated at 195° C. for 3 hours under nitrogen. Vacuum (ca. 0.1 mm. Hg) was then applied and heating at the same temperature was allowed to continue for 2 days. The reaction mixture was cooled, dissolved in THF, and the dark brown, gluey polymer separated upon addition of water. The polyester was dissolved in benzene, and the solution dried over magnesium sulphate. On removal of the solvent under reduced pressure, there was obtained the polyester which had an inherent viscosity of 0.18. The infrared spectrum was as expected. Molecular weight, determined by titration, was about 1900–2000.

The polyester prepared as above described was added to a mixture of mercuric acetate (1.211 g.), copper resinate (0.531 g.), and vinyl acetate (300 ml.) and the mixture stirred until it became homogeneous. Then concentrated sulphuric acid (10 drops) was added and the reaction continued for 5.5 days at room temperature. At the end of this time, excess vinyl acetate and acetic acid were distilled off under reduced pressure at a temperature below 60° C. The residue was a dark-colored material which was dissolved in THF, and washed several times with dilute sodium carbonate solution. At the end of the washing, the polymeric material was taken up into ether, dried over magnesium sulfate, and the solvent stripped off. The vinyl ester of the polyester was obtained in 55% yield and had an inherent viscosity of 0.13.

*Analysis* (percent): C, 75.95; H, 12.15.

EXAMPLE 3.—ACRYLATE OF THE POLYESTER OF 12-HYDROXYSTEARIC ACID

Methyl 12-hydroxystearate (92 g.) and litharge (1.36 g.) were stirred and heated at 170±5° C. under nitrogen for 5 hours. At the end of this period, vacuum (0.5 mm.) was applied and heating continued for an additional 19 hours. Upon termination of the reaction, the mixture was cooled to room temperature under vacuum, dissolved in THF and the polymer isolated by addition of water to the solution. The polymer was dissolved in chloroform, the solution filtered and washed with aqueous sodium chloride, dried over magnesium sulphate, and the solvent evaporated. The residue was dissolved in ether, and the solution was filtered and the solvent evaporated, yielding the methyl ester of the polyester in quantitative yield. It had an inherent viscosity of 0.25, and was a gluey material at room temperature.

*Analysis* (percent): C, 76.48; H, 12.14.

Fifty-five grams of the methyl polyester prepared as described above was dissolved in 400 ml. of chloroform, and to this solution was added copper resinate (0.3 g.), acryloyl chloride (5 g.), in chloroform (30 ml.). A solution of triethyl amine (6 g.) in chloroform (70 ml.) was added dropwise over a period of 25 minutes at room temperature. The mixture was heated at reflux for 6.5 hours, and then allowed to stand at room temperature overnight. The reaction mixture was filtered and the filtrate washed with 500 ml. of 5% hydrochloric acid, 500 ml. of 5% sodium carbonate solution, and water. The organic layer was then dried over magnesium sulphate and the solvent removed under reduced pressure at room temperature. The residue was dried in a vacuum oven first at 27° C., then at 40° C. over phosphorus pentoxide. There was obtained 35 g. of the acrylate which had an inherent viscosity of 0.20. Absorption in infrared analysis were as expected.

*Analysis* (percent): C, 76.12; H, 11.81.

EXAMPLE 4.—ACRYLATE OF THE POLYESTER OF 10-HYDROXYDECANOIC ACID

A solution of 10-hydroxydecanoic acid (20 g.) in anhydrous methanol (500 ml.), catalyzed by a few drops of concentrated sulphuric acid and ca. 5 ml. of 2,2-dimethoxypropane, was refluxed for 2–7 days. There was formed a polyester, M.P. 76–77° C., inherent viscosity 0.17.

The above polyester (5.4 g.) and an excess of acryloyl chloride (0.5 g.) were dissolved in anhydrous ether (200 ml.) and chloroform (100 ml.). A solution of 0.5 g. of triethylamine in 20 ml. ether was added over a period of about 20 minutes. The reaction was continued at room temperature for 4 days. Upon termination of the reaction, solvent was removed under reduced pressure. The residue was twice dissolved in chloroform and reprecipitated by addition of acetone. After drying thoroughly in vacuum, 4.24 g. of the acrylate was obtained, M.P. 77–78° C.

*Analysis* (percent): C, 68.88; H, 10.66.

EXAMPLE 4A

The methyl ester of the polyester of 10-hydroxydecanoic acid also has been prepared by the following way. 10-hydroxydecansic acid (34.8 g.) was refluxed in 800 ml. of methanol with 5 ml. of 2,2-dimethoxypropane and a few drops of concentrated sulfuric acid for 24 hours. At the end of this period, methanol was distilled off and the residual oily material was stirred in about 500 ml. of ice-water containing 10 g. of potassium carbonate. The aqueous layer was discarded and the polymer was taken up into chloroform, which was dried. And the solvent was removed. The residue was again subjected to polymerization by heating with 1.1 g. of lead oxide at 170° C. in vacuo for 3 hours. The polyester thus obtained had an inherent viscosity of 0.21.

EXAMPLE 5

Copolymers were prepared from vinyl chloride and polymerizable polyester derivatives prepared as described in the preceding examples. Emulsion copolymerization was employed, using redox initiation (Procedure A) or radical initiation (Procedure B). The techniques used are demonstrated by the following illustrative examples.

Procedure A (Redox initiation): A pressure tube is charged with:

Ferrous sulphate heptahydrate—0.04 g.
Sodium dodecyl benzene sulphonate ("Siponate DS–10")—0.04 g.
Sodium pyrophosphate decahydrate—0.4 g.
Deaerated, distilled water—20 ml.
Vinyl polyester—0.8 g.

The tube is then chilled to −78° C. An excess of vinyl chloride is condensed in the tube, and then allowed to boil out until the amount retained is 3.2 g. In this way air is removed from the vapor space and the desired proportion of co-reactants (80% vinyl chloride; 20% vinyl polyester) is obtained. Benzoyl peroxide (0.08 g.) is then added, and the tube immediately capped. The polymerization is conducted at room temperature with mechanical shaking for 50 hours. At the end of this time, the contents of the tube are poured into aqueous sodium chloride. Precipitation is allowed to continue overnight, then the polymer is collected, reprecipitated from THF-water and then from THF-methanol, and finally dried thoroughly in a vacuum oven.

Procedure B (Free radical initiation): A pressure tube is charged with:

Vinyl polyester—0.8 g.
Sodium dodecyl benzene sulphonate ("Siponate DS–10")—0.04 g.
Oxygen-free buffer solution, pH 7 (Beckman pH solution 3501)—20 ml.

The tube is then chilled and charged with vinyl chloride as in Procedure A. Potassium persulphate (0.04 g.) is then added and the tube is capped. The polymerization is conducted at 60° C. with mechanical shaking for 24 hours. The polymer is isolated as in the case of Procedure A.

In the following tables there are reported the ingredients used, reaction conditions and results.

TABLE I.—COPOLYMERS OF VINYL CHLORIDE AND VINYL ESTER OF 10-HYDROXYDECANOIC ACID

| Run | 1 | 2 | 3 |
|---|---|---|---|
| Amount of polyester charged, percent | 15.0 | 20 | 30 |
| Inherent viscosity of polyester | 0.37 | 0.25 | 0.25 |
| Copolymerization procedure | A | A | A |
| Copolymerization temperature, °C | 25 | 25 | 25 |
| Copolymerization time, hours | 113 | 50 | 50 |
| Conversion, percent | 89 | 58 | 50 |
| Inherent viscosity of copolymer | 1.12 | 1.40 | 0.7 |
| Percent polyester found in copolymer | 16.0 | 28.0 | 55.2 |

TABLE II.—COPOLYMERS OF VINYL CHLORIDE AND ACRYLATE OF POLYESTER OF 10-HYDROXYDECANOIC ACID

| Run | 1 | 2 | 3 | 4 |
|---|---|---|---|---|
| Amount of polyester charged, percent | 15.5 | 15 | 11 | 23 |
| Inherent viscosity of polyester | 0.17 | 0.18 | 0.17 | 0.17 |
| Copolymerization procedure | B | A | A | A |
| Copolymerization temperature, °C | 60 | 25 | 25 | 25 |
| Copolymerization time, hours | 34 | 160 | 65 | 65 |
| Conversion, percent | 91 | 89 | 82 | 82 |
| Inherent viscosity of copolymer | 0.66 | 1.20 | 1.12 | 0.98 |
| Percent polyester found in copolymer | 13.9 | 16.3 | 10.6 | 25.2 |

TABLE III.—COPOLYMERS OF VINYL CHLORIDE AND VINYL ESTER OF POLYESTER OF 12-HYDROXYSTEARIC ACID

| Run | 1 | 2 | 3 | 4 |
|---|---|---|---|---|
| Amount of polyester charged, percent | 19 | 15 | 15 | 15 |
| Inherent viscosity of polyester | 0.13 | 0.13 | 0.13 | 0.13 |
| Copolymerization procedure | A | *A | *A | A |
| Copolymerization temperature, °C | 25 | 25 | 25 | 25 |
| Copolymerization time, hours | 50 | 48 | 48 | 87 |
| Conversion, percent | 79 | 71 | 75 | 77 |
| Inherent viscosity of copolymer | 1.25 | 0.87 | 0.81 | 1.22 |
| Percent polyester found in copolymer | 22.1 | 15.8 | 16.8 | 14.4 |

* In Runs 3 and 4, the emulsifier used was "ORR Soap"—a mixture of sodium stearate, palmitate, and oleate.

TABLE IV.—COPOLYMERS OF VINYL CHLORIDE AND ACRYLATE OF POLYESTER OF 12-HYDROXYSTEARIC ACID

| Run | 1 | 2 | 3 | 4 | 5 |
|---|---|---|---|---|---|
| Amount of polyester charged, percent | 20 | 25 | 22 | 30 | 15 |
| Inherent viscosity of polyester | 0.18 | 0.24 | 0.18 | 0.18 | 0.20 |
| Copolymerization procedure | A | A | B | B | A |
| Copolymerization temperature, °C | 25 | 25 | 60 | 60 | 25 |
| Copolymerization time, hours | 65 | 114 | 48 | 48 | 87 |
| Conversion, percent | 58 | 83 | 93 | 90 | 68 |
| Inherent viscosity of copolymer | 1.13 | 1.40 | 0.72 | 0.67 | 1.14 |
| Percent polyester found in copolymer | 23.7 | 26.1 | 19.8 | 25.2 | 17.5 |

Obeservations of the copolymers prepared as above described

When heated, the copolymers turned colored at about 140° C., and softened at about 200° C.

Films cast from THF solutions of the copolymers were generally flexible and did not become brittle at 0° C. Also, samples of these films were stored for several months and were found to have retained their flexibility; they could be flexed repeatedly without cracking. The films prepared from copolymers having an inherent viscosity of 1 or higher displayed especially high tensile strength.

The films prepared from copolymers wherein the polyester was derived from 10-hydroxydecanoic acid were water-clear; those wherein the polyester was derived from 12-hydroxystearic acid were slightly opaque.

Stability test: A sample of one of the copolymers that contained 6.3% of acrylate of polyester of 10-hydroxydecanoic acid (1.676 g.) in 50 ml. of dioxane, 100 ml. of water, and 10 g. of sodium carbonate was heated at reflux (about 100° C.) for 2.5 hours, and then allowed to stand at room temperature overnight. Upon purification, 93% (1.55 g.) of the polymer was recovered. Its infrared spectrum was identical with that of the starting material.

EXAMPLE 6

A series of vinyl chloride-polyester copolymers were prepared using the redox initiation system (Procedure A, described above). The polymerizations were conducted at room temperature for 4 to 7 days. In most instances conversions of 80% and better were obtained. The materials used and the properties of the copolymers are listed below:

TABLE V.—COPOLYMERS OF VINYL CHLORIDE AND POLYESTERS

| Run | Polyester* | Amount of polyester charged, percent | Inherent visc. of polyester | Inherent visc. of copolymer | Amount of polyester in copolymer, percent |
|---|---|---|---|---|---|
| 1 | APS | 15.0 | 0.23 | 1.19 | 13.9 |
| 2 | APS | 14.8 | 0.20 | 1.16 | 13.3 |
| 3 | VPS | 17.0 | 0.14 | 1.08 | 15.4 |
| 4 | VPS | 15.0 | 0.17 | 1.02 | 15.0 |
| 5 | APS | 25.0 | 0.24 | 1.40 | 26.1 |
| 6 | VPS | 25.1 | 0.14 | 1.20 | 21.3 |
| 7 | VPD | 15.0 | 0.37 | 1.12 | 16.0 |
| 8 | VPD | 15.0 | 0.25 | 1.31 | 18.3 |
| 9 | APD | 15.0 | 0.18 | 1.20 | 16.1 |

*APS=acrylate of polyester of 12-hydroxystearic aicd; VPS=vinyl ester of polyester of 12-hydroxystearic aicd; ADP=acrylate of polyester of 10-hydroxydecanoic acid; VPD=vinyl ester of polyester of 10-hydroxydecanoic acid.

EXAMPLE 7.—VINYL ESTER OF POLYESTER OF 12-HYDROXYDODECANOIC ACID

The polyester of 12-hydroxydodecanoic acid obtained by heating the acid with 2% antimony trioxide at 160° C. for 2 hours under nitrogen and 2 additional hours in vacuo was vinylated by the method mentioned before. The vinyl ester of polyester of 12-hydroxydodecanoic acid had a melting point of 81–83° C., and an inherent viscosity of 0.22.

EXAMPLE 8.—VINYL CHLORIDE-VINYL ESTER OF POLYESTER OF 12-HYDROXYDODECANOIC ACID COPOLMYER

The copolymer was prepared by charging 25% polyester and 75% vinyl chloride with the redox initiation system at 25° C. for 63 hours. It was obtained in 61% yield, and had an inherent viscosity of 1.07. Films cast from THF solutions are flexible.

EXAMPLE 9.—ACRYLATE OF POLYESTER OF RICINOLEIC ACID

Ricinoleic acid was methylated and the methyl ester (B.P. 173° C./0.15 mm.) was polymerized in the presence of a catalytic amount of lead oxide following the same procedure used for methyl 12-hydroxystearate. The acrylate of the polyester was prepared by reacting with acrylyl chloride. The polyester was a viscous liquid and had an inherent viscosity of 0.13. Copolymerization experiments with vinyl chloride have been conducted in the redox system. The conversion was rather low; probably due to the presence of unsaturation in the polyester. Results are shown in Table VI.

TABLE VI.—COPOLYMERS OF VINYL CHLORIDE AND ACRYLATE OF POLYESTER OF RICINOLEIC ACID

| Run | 1 | 2 | 3 |
|---|---|---|---|
| Amount of polyester charged, percent | 10 | 20 | 27 |
| Inherent viscosity of polyester | 0.13 | 0.13 | 0.13 |
| Copolymerization procedure | A | A | *A |
| Copolymerization temperature, °C | 25 | 25 | 25 |
| Copolymerization time, hours | 126 | 126 | 63 |
| Conversion, percent | 20 | 24 | 30 |
| Inherent viscosity of copolymer | 1.45 | 0.73 | 0.42 |
| Percent polyester found in copolymer | 23.2 | 59.3 | |

*In run 3, 4% benzoyl peroxide was used.

Having thus described the invention, what is claimed is:
1. An addition copolymer of
   a major proportion of a polymerizable vinyl monomer, and
   a minor proportion of a vinyl ester terminated polyester of an aliphatic monohydroxycarboxylic acid containing 6 to 24 carbon atoms and wherein the hydroxyl group is at least 5 carbon atoms removed from the carboxyl group.
2. An addition copolymer of
   90 to 75% by weight of vinyl chloride, and
   10 to 25% by weight of a vinyl ester terminated polyester of an aliphatic monohydroxycarboxylic acid containing 8 to 24 carbon atoms and wherein the hydroxyl group is at least 5 carbon atoms removed from the carboxyl group.

3. The copolymer of claim 2 wherein the aliphatic monohydroxycarboxylic acid is 10-hydroxydecanoic acid.

4. The copolymer of claim 2 wherein the aliphatic monohydroxycarboxylic acid is 12-hydroxystearic acid.

5. The copolymer of claim 2 wherein the aliphatic monohydroxycarboxylic acid is ricinoleic acid.

6. The copolymer of claim 2 wherein the aliphatic monohydroxycarboylic acid is 12-hydroxydodecanoic acid.

7. An addition copolymer of
a major proportion of a polymerizable vinyl monomer, and
a minor proportion of an acrylate or methacrylate terminated polyester of an aliphatic monohydroxycarboxylic acid containing 6 to 24 carbon atoms and wherein the hydroxyl group is at least 5 carbon atoms removed from the carboxyl group.

8. An addition copolymer of
90 to 75% by weight of vinyl chloride, and
10 to 25% by weight of an acrylate or methacrylate terminated polyester of an aliphatic monohydroxycarboxylic acid containing 6 to 24 carbon atoms and wherein the hydroxyl group is at least 5 carbon atoms removed from the carboxyl group.

9. The copolymer of claim 8 wherein the aliphatic monohydroxycarboxylic acid is 10-hydroxydecanoic acid.

10. The copolymer of claim 8 wherein the aliphatic monohydroxycarboxylic acid is 12-hydroxystearic acid.

11. The copolymer of claim 8 wherein the aliphatic monohydroxycarboxylic acid is ricinoleic acid.

12. The copolymer of claim 8 wherein the aliphatic monohydroxycarboxylic acid is 12-hydroxydodecanoic acid.

References Cited

UNITED STATES PATENTS

| | | | |
|---|---|---|---|
| 2,141,546 | 12/1938 | Strain | 260—78 |
| 2,534,255 | 12/1950 | Filachione | 260—484 |
| 3,227,694 | 1/1966 | Masters | 260—78.5 |

MURRAY TILLMAN, Primary Examiner

J. SEIBERT, Assistant Examiner

U.S. Cl. X.R.

204—159.15, 159.16; 260—29.6 RB, 31.2 XA, 78.3 UA, 484 A, 875, 884, 885